(12) United States Patent
Bastarrachea et al.

(10) Patent No.: US 12,252,434 B2
(45) Date of Patent: Mar. 18, 2025

(54) FEEDER ALCOVE AND BATCH FEEDING APPARATS FOR A MELTER

(71) Applicant: Owens-Brockway Glass Container Inc., Perrysburg, OH (US)

(72) Inventors: Karin Gabriela Bastarrachea, Perrysburg, OH (US); Shane T. Rashley, Bowling Green, OH (US); Philip J. Rausch, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 337 days.

(21) Appl. No.: 17/039,713

(22) Filed: Sep. 30, 2020

(65) Prior Publication Data

US 2022/0411306 A1    Dec. 29, 2022

(51) Int. Cl.
C03B 5/23      (2006.01)
C03B 5/193     (2006.01)
C03B 5/235     (2006.01)

(52) U.S. Cl.
CPC ............ C03B 5/193 (2013.01); C03B 5/2356 (2013.01)

(58) Field of Classification Search
None
See application file for complete search history.

(56) References Cited

U.S. PATENT DOCUMENTS

| | | | |
|---|---|---|---|
| 2,001,766 A | 5/1935 | Brown | |
| 2,479,805 A | 8/1949 | Batchell | |
| 2,749,666 A * | 6/1956 | Baque | C03B 3/00 65/347 |
| 3,170,781 A * | 2/1965 | Keefer | F23C 3/004 65/159 |
| 3,193,119 A * | 7/1965 | Blaine | C03B 3/00 65/335 |
| 3,733,189 A * | 5/1973 | Zurheide et al. | C03B 37/08 65/540 |
| 4,197,109 A | 4/1980 | Frazier et al. | |
| 4,226,564 A | 10/1980 | Takahashi et al. | |
| 4,277,277 A | 7/1981 | Propster | |
| 4,496,387 A * | 1/1985 | Heithoff | C03B 3/00 65/335 |

(Continued)

FOREIGN PATENT DOCUMENTS

EP    3088369 A1    11/2016

OTHER PUBLICATIONS

PCT Search Report and Written Opinion, PCT Serial No. PCT/US2021/052525, PCT Filing Date: Sep. 29, 2021, Applicant: Owens-Brockway Glass Container Inc., Mail date: Feb. 11, 2022.

*Primary Examiner* — Jodi C Franklin

(57) ABSTRACT

A batch feeding apparatus, a submerged combustion melter, and method are disclosed. The batch feeding apparatus can include a batch feeding apparatus comprising a detachable feeder alcove for providing batch material to a melter, the feeder alcove including at least one side wall and a cover; and a batch feeder sealingly coupled to the cover, that feeds the batch material to the feeder alcove. The batch feeding apparatus may include an extendable panel that extends downwardly below a batch inlet of the feeder alcove to molten glass, and is configured to maintain contact with the molten glass to seal off a feeder alcove interior. Additionally, the batch feeding apparatus may include a heating device, a cleaning device, and/or a storage device.

19 Claims, 3 Drawing Sheets

(56) References Cited

U.S. PATENT DOCUMENTS

| | | | | |
|---|---|---|---|---|
| 4,539,034 A * | 9/1985 | Hanneken | ............... | F23D 14/22 65/134.4 |
| 4,545,800 A * | 10/1985 | Won | ........................ | C03B 3/02 65/134.4 |
| 4,634,461 A * | 1/1987 | Demarest, Jr. | ........ | C03B 5/2356 65/335 |
| 4,969,942 A * | 11/1990 | Schwenninger | ........ | C03B 5/235 65/169 |
| 5,073,183 A | 12/1991 | Hammond et al. | | |
| 5,588,978 A | 12/1996 | Argent et al. | | |
| 6,109,062 A * | 8/2000 | Richards | ................ | C03B 5/187 65/134.4 |
| 9,394,192 B2 | 7/2016 | Villeroy De Galhau et al. | | |
| 9,856,162 B2 | 1/2018 | Lindig et al. | | |
| 10,029,934 B2 | 7/2018 | Wang et al. | | |
| 10,118,852 B2 | 11/2018 | Wang et al. | | |
| 10,125,041 B2 | 11/2018 | Sorg et al. | | |
| 2006/0266080 A1 * | 11/2006 | Pelton | .................... | C03B 5/193 65/157 |
| 2008/0276652 A1 | 11/2008 | Bauer et al. | | |
| 2011/0236846 A1 * | 9/2011 | Rue | ........................ | F27B 3/205 432/195 |
| 2011/0308280 A1 * | 12/2011 | Huber | .................... | F23D 14/32 65/347 |
| 2012/0070252 A1 | 3/2012 | Waltert | | |
| 2012/0077135 A1 * | 3/2012 | Charbonneau | ........ | C03B 5/2356 432/121 |
| 2013/0086950 A1 * | 4/2013 | Huber | .................... | C03B 5/193 65/347 |
| 2013/0086951 A1 * | 4/2013 | Charbonneau | .......... | F27B 14/14 65/346 |
| 2013/0114638 A1 * | 5/2013 | Lindig | ..................... | C03B 3/00 373/34 |
| 2013/0260980 A1 * | 10/2013 | Touslee | .................... | C03B 5/44 44/628 |
| 2014/0007622 A1 * | 1/2014 | Shock | ...................... | C03B 5/20 65/335 |
| 2014/0090423 A1 * | 4/2014 | Charbonneau | ............ | C03B 5/20 65/135.1 |
| 2014/0208800 A1 * | 7/2014 | McCann | .................... | C03B 5/24 65/158 |
| 2014/0311184 A1 * | 10/2014 | Hansen | ................... | C03B 3/026 65/28 |
| 2014/0318187 A1 * | 10/2014 | Sborshikov | ............. | C03B 3/023 65/347 |
| 2014/0371116 A1 * | 12/2014 | Hojaji | ..................... | C03B 5/005 523/219 |
| 2015/0013386 A1 * | 1/2015 | Villeroy De Galhau | ..................... | C03B 5/2353 65/335 |
| 2015/0175464 A1 * | 6/2015 | Lefrere | ................... | C03B 5/265 65/135.1 |
| 2015/0307382 A1 * | 10/2015 | Wang | ..................... | C03B 3/005 65/335 |
| 2017/0066672 A1 * | 3/2017 | Huber | ................... | C03B 5/2356 |
| 2017/0096358 A1 * | 4/2017 | Martin | ................... | C03C 11/007 |
| 2017/0107139 A1 * | 4/2017 | Baker | ..................... | C03B 5/005 |
| 2017/0217812 A1 * | 8/2017 | De Angelis | ............... | C03B 5/20 |
| 2017/0369352 A1 * | 12/2017 | Huber | ................... | C03B 5/2356 |
| 2018/0002213 A1 | 1/2018 | Demott et al. | | |
| 2018/0029915 A1 | 2/2018 | Huber | | |
| 2018/0111866 A1 | 4/2018 | Macphee et al. | | |
| 2018/0237322 A1 * | 8/2018 | Lewis | ..................... | C03B 5/027 |
| 2018/0244554 A1 | 8/2018 | Mighton et al. | | |
| 2019/0112214 A1 | 4/2019 | Sorg et al. | | |
| 2019/0210906 A1 * | 7/2019 | Qian | ..................... | C03B 5/193 |
| 2019/0284078 A1 * | 9/2019 | Wang | ..................... | C03B 5/05 |
| 2021/0009456 A1 * | 1/2021 | Wang | ..................... | C03B 5/193 |
| 2021/0094859 A1 * | 4/2021 | Wang | ..................... | C03C 1/004 |
| 2021/0155521 A1 * | 5/2021 | Baret | ...................... | C03B 1/02 |

* cited by examiner

100 System

184 Compressed Gas Device

186 Heating Device

202 Provide vitrifiable feed material to a batch feeder

204 Carry vitrifiable feed material with batch feeder to feeder alcove

206 Melt vitrifiable feed material in melter

208 Provide compressed gas to feeder alcove or melter

210 Adjust movable gate based on melt level in melter

FIG. 7

FEEDER ALCOVE AND BATCH FEEDING APPARATS FOR A MELTER

TECHNICAL FIELD

This patent application discloses devices and methods for use in glass manufacturing, and more particularly, equipment to provide batch materials for a melter.

BACKGROUND

Glass manufacturing can occur at high temperatures that require the equipment used in the glass manufacturing process to withstand harsh conditions. In particular, submerged combustion melting ("SCM") is a specific type of glass manufacturing, in which an air-fuel or oxygen-fuel mixture is injected directly into a pool of molten glass. As combustion gases forcefully bubble through the molten glass, they create a high-heat transfer rate and turbulent mixing of the molten glass until it achieves a uniform composition. The combustion gases can rise through the molten glass and exit the SCM through an exhaust vent.

BRIEF SUMMARY OF THE DISCLOSURE

The present disclosure embodies a number of aspects that can be implemented separately from or in combination with each other.

In accordance with one aspect of the disclosure, there is provided a batch feeding apparatus that comprises a detachable feeder alcove for providing batch material to a melter, the feeder alcove including at least one side wall and a cover; and a batch feeder sealingly coupled to the cover, that feeds the batch material to the feeder alcove. The batch feeding apparatus may include an extendable panel that extends downwardly below a batch inlet of the feeder alcove to molten glass, and is configured to maintain contact with the molten glass to seal off a feeder alcove interior. Additionally, the batch feeding apparatus may include a heating device, a cleaning device, and/or a storage device.

In accordance with another aspect of the disclosure, there is provided a submerged combustion melter comprising a melting tank including: a floor configured to carry at least one submerged combustion burner, a roof, an inlet wall extending between the floor and the roof to at least partially establish a melting tank interior having a tank head space, and including at least one tank inlet; and a feeder alcove appended to the inlet wall of the melting tank to cover the at least one tank inlet, and including: at least one upstream wall, and a cover extending between the at least one upstream wall of the feeder alcove and the inlet wall of the melting tank to at least partially establish a feeder interior having a feeder head space shorter than the tank head space, and including at least one batch inlet configured to receive glass batch into the feeder interior. The submerged combustion melter may include an extendable panel carried by at least one of the melting tank and/or the feeder alcove.

In accordance with another aspect of the disclosure, there is provided a method of providing vitrifiable feed material to a melter having some or all of the features discussed herein. The method includes providing vitrifiable feed material to a batch feeder; carrying the vitrifiable feed material with the batch feeder to a detachable feeder alcove with at least one side wall and a cover, wherein the batch feeder is sealingly coupled to the cover, and wherein the feeder alcove is at a reduced pressure; melting the vitrifiable feed material in the melter, where the melter is in downstream communication with the feeder alcove. In some instances, the method may include providing compressed gas to at least one of the detachable feeder alcove or the melter and/or adjusting an extendable panel carried by at least one of the melter or the feeder alcove based on a melt level in the melter.

BRIEF DESCRIPTION OF THE DRAWINGS

The disclosure, together with additional objects, features, advantages and aspects thereof, will be best understood from the following description, the appended claims and the accompanying drawings, in which:

FIG. 6 is a diagrammatic view illustrating the system shown in FIG. 1 having a compressed gas device and/or a heating device, in accordance with an illustrative aspect of the present disclosure; and FIG. 7 is a flow diagram showing various steps of an illustrative embodiment of a method for providing vitrifiable feed material to a melter as shown in FIGS. 1 through 5.

DETAILED DESCRIPTION

In accordance with at least one aspect of the disclosure, a melter and a feeder alcove in upstream communication with the melter is provided that prevents or reduces carryover of fine particulates from feed material and avoids equipment damage from the harsh conditions of the melting furnace.

Due to flow of combustion gases above a glass melt surface in a submerged combustion melter (SCM), some fine particles in the glass batch material can be carried away by the combustion gases exiting the SCM, which can be referred to as "carryover," when glass batch material is fed from the top of the SCM. Carryover can lead to a loss of batch material, result in an unintentional change in melt composition, and create additional environmental concerns. Often, a SCM includes a particulate collection device, for example a baghouse, to collect the fine particles from the exhaust gases. However, including the particulate collection device adds cost to the process.

Sometimes, the glass batch material may be fed below the glass melt surface to minimize carryover. However, feeding the glass batch material below the glass melt can present its own challenges. For example, a seal may fail, and glass melt may leak through an opening in the SCM for feeding the glass batch material below the glass melt surface. Additionally, glass batch material fed below the glass melt surface may be prematurely softened by the high-temperature glass melt and/or can be exposed to back pressure, and can become difficult to move into the SCM.

Accordingly, a melter and a feeder alcove in communication with the melter is disclosed. A batch feeder can feed vitrifiable feed material into the feeder alcove that can be melted by glass melt in the melter. An extendable panel can be disposed between a feeder interior of the feeder alcove and a tank interior of the melter and extended to be at least partially submerged in the glass melt to prevent carryover between the feeder interior and the tank interior. Exhaust gases in the glass melting tank cannot flow into the feeder tank to make direct contact with the glass batch material because of the extendable panel, thus preventing carryover of fine particulate in the glass batch material. Additionally, the melter can melt at different glass melt levels because the batch feeder and feeder alcove can be configured to feed vitrifiable feed material at different levels, and less head space is needed to feed the vitrifiable feed material as close as possible to the glass melt level. Further, the feeder alcove can comprise multiple panels enabling the feeder alcove to quickly be detachable from the melter and to be quickly assembled and disassembled.

Figure 1:
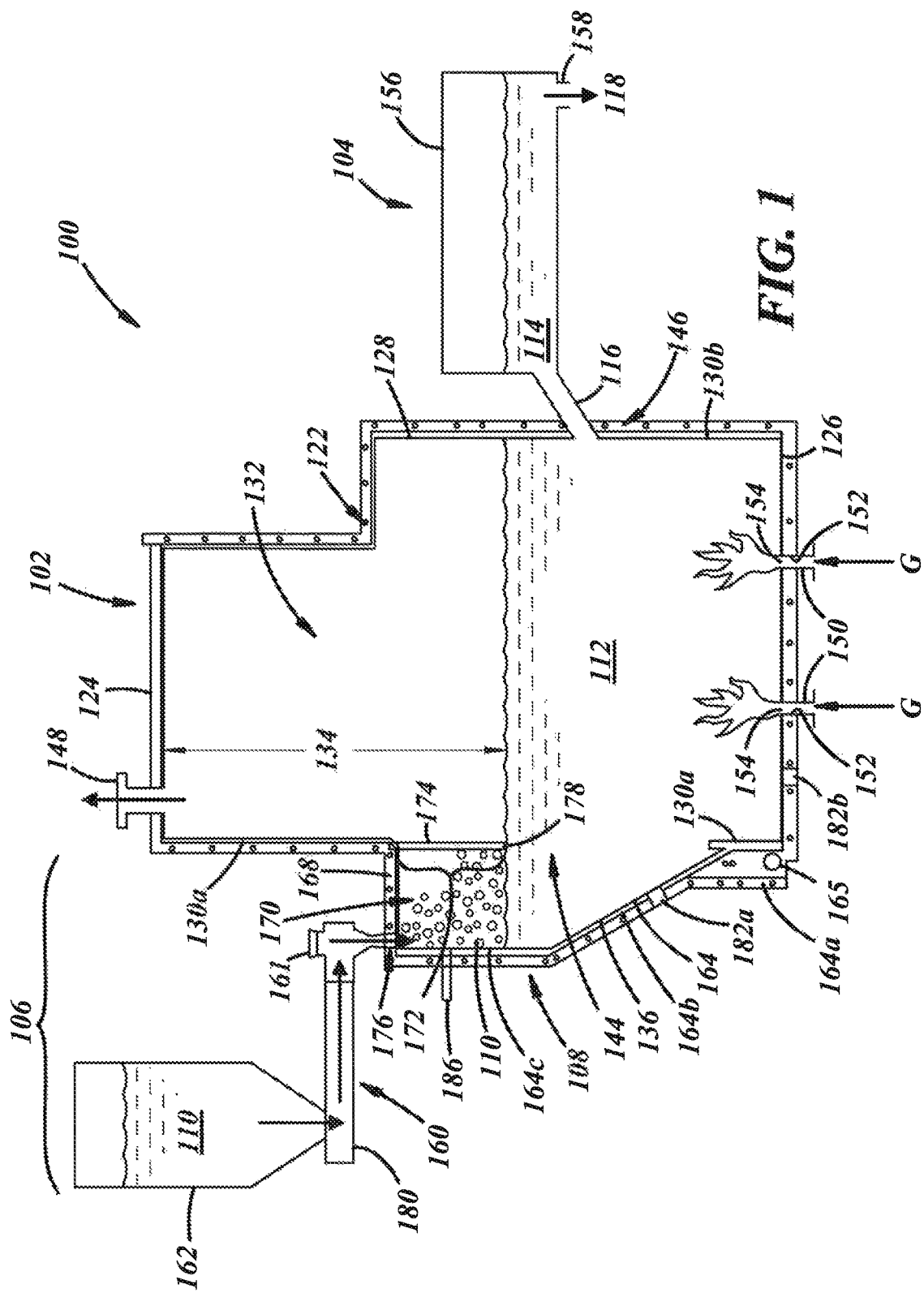
FIG. 1 is a schematic cross-sectional view illustrating a system including a melter, and a batch feeding apparatus and stilling vessel coupled to the melter, in accordance with an illustrative embodiment of the present disclosure.

Referring to FIG. 1, a batch feeding system 100 for producing glass can include a melter 102, a stilling vessel 104, and a batch feeding apparatus 106 with a feeder alcove 108 in upstream communication with the melter 102 according to various practices of the present disclosure. The melter 102 can be configured for melting and/or containing a molten material and can be fed with a vitrifiable feed material 110, for example glass batch that exhibits a glass-forming formulation, or a metal for forming molten metal. When the vitrifiable feed material 110 includes glass batch, the batch can be melt-reacted inside the melter 102 within an agitated glass melt 112 to produce molten glass 114. The molten glass 114 can be drawn from the glass melt 112 and discharged from the melter 102 through a throat 116 that interconnects and establishes fluid communication between the melter 102 and the stilling vessel 104. The stilling vessel 104 can receive the molten glass 114 discharged from the melter 102 and can controllably deliver a molten glass feed 118 to a downstream component (not shown). The downstream component may be, for example, a glass finer that fines and optionally thermally conditions the molten glass feed 118 for subsequent glass forming operations.

Figure 2:
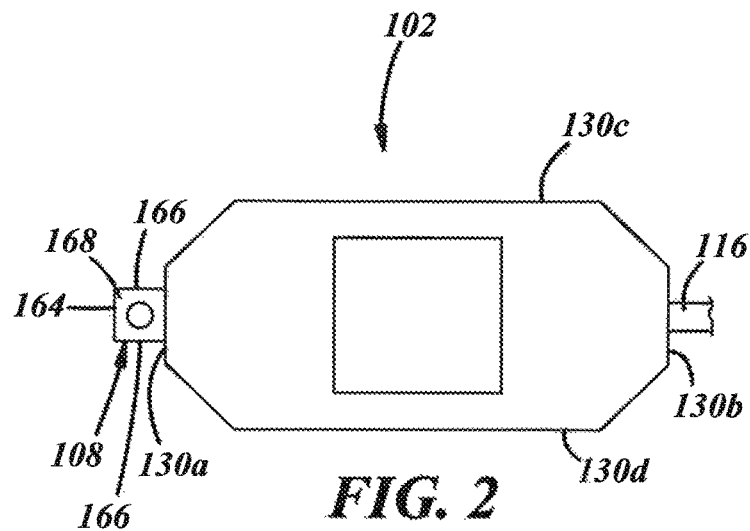
FIG. 2 is a top fragmentary view of the melter and batch feeding apparatus illustrated in FIG. 1, in accordance with an illustrative aspect of the present disclosure.

The melter 102 may include a glass melter (e.g., a submerged combustion melter), or any other furnace suitable for melting glass, metal, or other materials, and can include a housing 122 that has a roof 124, a floor 126, and a surrounding upstanding wall 128 that connects the roof 124 and the floor 126. The surrounding upstanding wall 128 further includes a front-end wall 130a, a rear-end wall 130b that opposes and is spaced apart from the front-end wall 130a, and two opposed lateral sidewalls 130c, 130d (FIG. 2) that connect the front-end wall 130a and the rear-end wall 130b, as shown in FIGS. 1 and 2. Together, the roof 124, the floor 126, and the surrounding upstanding wall 128 define an melter interior 132 of the melter 102 that holds glass melt 112 when the melter 102 is operational. The roof 124 and the glass melt 112 define a tank head space 134. Although the shape of the melter 102 is oblong octagonal in plant view, those of ordinary skill in the art would recognize that the geometry of the melter 102 may take on other shapes/configurations, including, but not limited to cylindrical, ovular, rectangular, or any other shape(s) suitable for melting glass, metal, or other materials.

Figure 3:
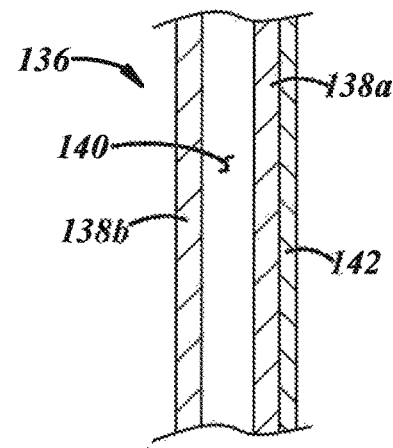
FIG. 3 is a cross-sectional fragmentary view of a fluid-cooled panel included in the melter shown in FIGS. 1 and 2, in accordance with an illustrative aspect of the present disclosure.

As illustrated in FIG. 3, at least the floor 126 and the upstanding wall 128 of the housing 122, as well as the roof 124, if desired, may be constructed from one or more interchangeable fluid-cooled panels 136. The fluid-cooled panels 136 may be configured to both provide structure to the melter 102 and provide cooling to at least a portion of the glass melt 112 using a cooling fluid, for example water. Using a fluid cooled panel may eliminate issues with unmelted inclusions from, for example, refractory materials. It is contemplated that the melter 102 may be comprised entirely of multiple fluid-cooled panels 136 or may comprise only one or several fluid-cooled panels 136. One or more of the fluid-cooled panels 136 may include an inner wall 138a and an outer wall 138b that together define an internal cooling space 140 through which a coolant, such as water, may be circulated. One or more baffles (not shown) may extend fully or partially between the confronting interior surfaces of the inner wall 138a and the outer wall 138b to direct the flow of the coolant along a desired flow path. The inner wall 138a, the outer wall 138b, and/or the one or more baffles can be formed of a material suitable for withstanding a high temperature environment of the melter 102, for example steel. In other embodiments, the various melter walls may be constructed of any refractory materials suitable for contact with molten glass, metal, or other materials. In yet other embodiments, the various melter walls may not include refractory materials, but may instead include other materials, for example, sodium silicate, that can be suitable as a safety layer.

With reference to FIGS. 1 and 3, the glass melt 112 in the melter 102 can typically exist in a liquid or semi-liquid state. A portion of the glass melt 112 that flows closer to the fluid-cooled panels 136 may become a solid (or at least a very viscous state) as a result of being liquid cooled. The inner wall 138a of each fluid-cooled panel 136 may support and be covered by a layer of the solidified material (which can be glass) comprising a frozen material layer 142 that forms in-situ between an outer skin of the glass melt 112 and a surface of the inner wall 138a. This frozen material layer 142, once formed, can shield and effectively protect the underlying inner wall 138a from the glass melt 112.

With continued reference to FIG. 1, the housing 122 of the melter 102 defines a tank inlet 144, a molten glass outlet 146 and a port 148. The tank inlet 144 may be defined in the front-end wall 130a of the housing 122, and the molten glass outlet 146 may be defined in the rear-end wall 130b of the housing 122 adjacent to or a distance above the floor 126, although other locations for the tank inlet 144 and the molten glass outlet 146 are possible. The tank inlet 144 provides an entrance to the melter interior 132 for the delivery of the vitrifiable feed material 110. The molten glass outlet 146 provides an exit from the melter interior 132 for the discharge of the glass melt 112 out of the melter 102.

The port 148 can be defined in the roof 124 of the housing 122 between the front-end wall 130a and the rear-end wall 130b. The port 148 can be configured to couple to a heat burner and/or other suitable system component.

The melter 102 may include one or more submerged burners 150. Each of the one or more submerged burners 150 can be mounted in a port 152 defined in the floor 126 (as shown) and/or at a portion of the surrounding upstanding wall 128 that is immersed by the glass melt 112. Each of the submerged burner(s) 150 can forcibly inject a combustible gas mixture G into the glass melt 112 through an output nozzle 154. The combustible gas mixture G can comprise fuel and an oxidant. The fuel supplied to the submerged burner(s) 150 may be methane or propane, and the oxidant may include pure oxygen or a high percentage (>80 vol %) of oxygen, in which case the burner(s) 150 can be oxy-fuel burners, or may be air or any oxygen-enriched gas. Upon being injected into the glass melt 112, the combustible gas mixture G can autoignite to produce combustion products— namely, $CO_2$, CO, $H_2O$, and/or any uncombusted fuel, oxygen, and/or other gas compounds such as nitrogen—that are discharged into and through the glass melt 112. Anywhere from one to thirty submerged burners 150 can be typically installed in the melter 102 although more burners may certainly be employed depending on the size and melt capacity of the melter 102.

With continued reference to FIG. 1, during operation of the melter 102 and the stilling vessel 104, each of the one or more submerged burners 150 can individually discharge combustion products directly into and through the glass melt 112 contained in the melter 102. The glass melt 112 can be a volume of molten glass that weighs, for example, between 1 US ton (1 US ton=2,000 lbs.) and 20 US tons, although the weight can be higher, and can generally be maintained at a constant volume during steady-state operation of the melter 102. As the combustion products are thrust into and through the glass melt 112, which create complex flow patterns and severe turbulence, the glass melt 112 can be vigorously agitated and experiences rapid heat transfer and intense shearing forces. The combustion products eventually escape the glass melt 112 and are removed from the melter interior 132 through an exhaust port (not shown) along with any other gaseous compounds that may volatize out of the glass melt 112. Additionally, in some circumstances, one or more non-submerged burners (not shown) may be mounted in the roof 124 and/or the surrounding upstanding wall 128 at a location above the glass melt 112 to provide heat, either directly by flame impingement or indirectly through radiant heat transfer, and to also facilitate foam suppression and/or destruction.

The stilling vessel 104 can be connected to the melter 102 with both the stilling vessel 104 and the melter 102 mechanically attached and supported on a common frame to rock and vibrate in unison in response to sloshing and generally turbulent nature of the glass melt 112. The stilling vessel 104 can receive the molten glass 114 discharged from the melter 102, which may have a tendency to have a fluctuating flow rate, and can deliver the molten glass feed 118 at a controlled flow rate to the downstream component. In this way, the melter 102 can be operated to produce molten glass, and the downstream processing of the molten glass—most notably glass fining and thermal conditioning—can be practiced more efficiently and with better overall control since the molten glass input flow to the component(s) performing those operations can be regulated with precision. The stilling vessel 104 can additionally be operated to partially fine and/or reduce the foam content of the intermediate pool of molten glass that pools within the stilling vessel 104 while also preventing heat loss from the glass before delivering the molten glass feed 118 to the downstream component. The stilling vessel 104 depicted in FIG. 1 includes a stilling tank 156 and a feeding spout 158 appended to the stilling tank 156. An example stilling vessel is thoroughly disclosed in U.S. patent application Ser. No. 16/590,068, filed on Oct. 1, 2019, and assigned to the assignee hereof, and the contents of which is incorporated herein by reference in its entirety.

While the one or more submerged burners 150 are being fired into the glass melt 112, the vitrifiable feed material 110 can be controllably introduced and dispersed into the melter interior 132 through the tank inlet 144. The dispersed vitrifiable feed material 110 can be subjected to intense heat transfer and rapid particle dissolution throughout the glass melt 112 due to the vigorous melt agitation and shearing forces caused by the submerged burner(s) 150. This causes the vitrifiable feed material 110 to quickly mix, react, and become chemically integrated into the glass melt 112.

With continued reference to FIG. 1, the vitrifiable feed material 110 introduced into the melter interior 132 can give a composition that is formulated to provide the glass melt 112, particularly at the molten glass outlet 146 with a predetermined glass chemical composition upon melting. For example, the glass chemical composition of the glass melt 112 may be a soda-lime-silica glass chemical composition, in which case the vitrifiable feed material 110 may be a physical mixture of virgin raw materials, cullet (i.e., recycled glass), and/or glass precursors that provides a source of $SiO_2$, $Na_2O$, and CaO in the correct proportions along with any of the other materials listed below in Table 1. The exact constituent materials that constitute the vitrifiable feed material 110 are subject to much variation while still being able to achieve the soda-lime-silica glass chemical composition as is generally well known in the glass manufacturing industry. The constituent materials may contain moisture levels up to 5%.

TABLE 1

Glass Chemical Composition of Soda-Lime-Silica Glass

| Component | Weight % | Raw Material Sources |
|---|---|---|
| $SiO_2$ | 60-80 | Quartz sand |
| NaO | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Flourines are a contaminant |

For example, to achieve a soda-lime-silica glass chemical composition in the glass melt 112, the vitrifiable feed material 110 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 110 to contribute one or more of $SiO_2$, $Na_2O$, CaO and possibly other oxide and/or non-oxide materials in the glass melt 112 depending on the desired chemistry of the soda-lime-silica glass chemical composition and the color of the glass articles being formed therefrom. These other virgin raw materials may include feldspar, dolomite, and calumite slag. In some instances, the vitrifiable feed material 110 may even include up to 100 wt. % cullet depending on a variety of factors. Additionally, the vitrifiable feed material 110 may include secondary or minor virgin raw materials that provide the soda-lime-silica glass chemical composition with colorants, decolorants, and/or redox agents that may be needed, and may further provide a source of chemical fining agents to assist with downstream bubble removal. The molten glass feed 118 may be further processed into a glass article including, for example, a flat glass or container glass article, among other options. To that end, the molten glass feed 118 delivered from the feeding spout 158 may have a soda-lime-silica glass chemical composition as dictated by the formulation of the vitrifiable feed material 110.

As shown in FIG. 1, the batch feeding apparatus 106 can be in upstream communication with the melter 102 and can include the feeder alcove 108, a batch feeder 160, and a storage device 162. The feeder alcove 108 can be offset from and securely attached to an upstream side of the melter 102 and appended to the front-end wall 130a of the melter 102. The feeder alcove 108 can be sealed and can at least partially cover the at least one tank inlet 144. The feeder alcove 108 can allow vitrifiable feed material 110 to be fed into the melter 102 as close as possible to the glass melt 112, which can reduce the speed of entrance of the vitrifiable feed material 110 into the feeder alcove 108 and function to reduce or prevent carryover. The feeder alcove 108 can be formed from at least one individual panel, which may be fluid-cooled, and can be detachable, repositionable, and/or reconfigurable by removing, adding, or relocating the at least one individual panel.

Shown in FIGS. 1 and 2, the feeder alcove 108 can include at least one upstream wall 164, at least one side wall 166, and a cover 168. The feeder alcove 108 also may include a bottom wall 165. In the illustrated embodiment, the upstream wall 164 includes a lower portion 164a extending upwardly from the bottom wall 168, an obliquely angled portion 164b extending up and away from the lower portion 164a in an upstream direction at an angle between 5 and 90 degrees from vertical including all ranges, subranges, values, and endpoints therein, and an upper portion 164c extending upwardly from the obliquely angled portion 164b, and the cover 168 extends from the upper portion 164c to the upstream wall 130a of the melter 102. The upstream wall 164 may include at least one fluid-cooled panel 136, and/or one or more panels composed of refractory material. The at least one side wall 166 can be coupled to and extend from the upstream wall 164 to the front-end wall 130a of the melter 102. Similar to the upstream wall 164, each side wall 166 may include at least one fluid-cooled panel 136 and/or one or more panels composed of refractory material.

As depicted in FIG. 1, the cover 168 can extend between the at least one upstream wall 164, the at least one side wall 166, and the front-end wall 130a of the melter 102 and may include at least one fluid-cooled panel 136 (FIG. 3), and/or one or more panels composed of refractory material. The cover 168 of the feeder alcove 108 can include at least one batch inlet 176, for example, an aperture, configured to receive the vitrifiable feed material 110 into the feeder alcove 108.

The cover 168, the at least one upstream wall 164, the at least one side wall 166, and the front-end wall 130a can at least partially establish a feeder interior 170 into which the vitrifiable feed material 110 can be fed. The feeder interior 170 can have a feeder head space 172 (e.g., a distance from the cover 168 to the surface of the glass melt 112) that is shorter than the tank head space 134, and the feeder interior 170 may be smaller in volume than the melter interior 132 of the melter 102. During operation, the feeder interior 170 and/or feeder head space 172 may be at least substantially occupied by the vitrifiable feed material 110, which can function as a protective barrier to the cover 168 and/or feeding equipment and prevent splashing of the glass melt 112 and protect the feeding equipment. Also, the feeder interior 170 can be sealed from an exterior of the feeder alcove 108, and may be at a reduced air pressure.

To help prevent or at least minimize the loss of some of the vitrifiable feed material 110 (e.g., fine particulates) through an exhaust port as unintentional feed material carryover, an extendable panel 174 can depend from the roof 124 of the housing 122 and/or from the feeder alcove 108 and may be positioned between the melter 102 and the feeder alcove 108 and proximate the tank inlet 144. The extendable panel 174 may be movable, for example, along a direction extending from the cover 168 and/or the front wall 130a toward or to a free surface of the melt 112. For example, the extendable panel 174 may be slid along and guided by at least one guide rail (not shown). The extendable panel 174 can be extended and/or moved using, for example, at least one pneumatic, hydraulic, and/or electric actuator (not shown). Additionally, the extendable panel 174 may be extended and/or moved using a jack screw with a gearbox and an electric motor and/or a hand wheel. It will be appreciated that the extendable panel 174 may be extended and/or moved using other suitable means. The extendable panel 174 may include a lower free end 178 that may be configured to be submerged, or is submergible, in the glass melt 112 over at least a portion of the tank inlet 144, as illustrated. The extendable panel 174 may be moved in response to fluctuations in the level of the glass melt 112. For example, when the level of the glass melt 112 rises, the extendable panel 174 may be raised, and when the level of the glass melt 112 lowers, the extendable panel 174 may also be lowered so that the lower free end 178 can remain submerged in the glass melt 112 to maintain a seal between the feeder interior 170 and the melter interior 132. The extendable panel 174 may be constructed from a fluid-cooled panel similar to that depicted in FIG. 3. Also, because of the submergible extendable panel 174, the seal between the feeder interior 170 and the melter interior 132 can serve to reduce carryover from the vitrifiable feed material 110 and allow the vitrifiable feed material 110 to include up to 100% raw material, which can include fine particulates.

Figure 4:
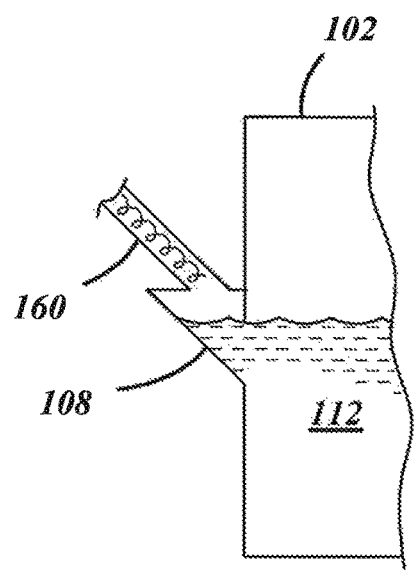
FIG. 4 is a schematic fragmentary cross-sectional view of a batch feeding apparatus coupled to the melter shown in FIGS. 1 and 2, where the batch feeding apparatus includes a batch feeder oriented at an oblique angle, in accordance with an illustrative aspect of the present disclosure.
Figure 5:
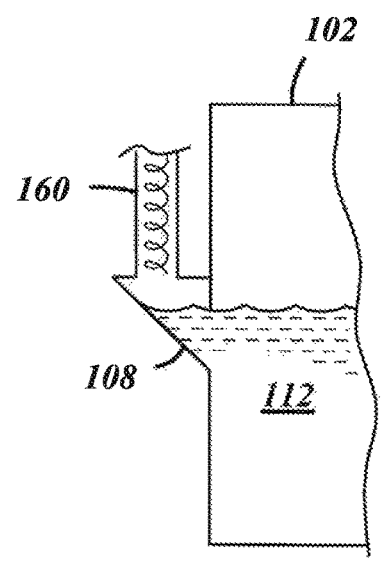
FIG. 5 is a schematic fragmentary cross-sectional view of a batch feeding apparatus coupled to the melter shown in FIGS. 1 and 2, where the batch feeding apparatus includes a batch feeder vertically-oriented, in accordance with an illustrative aspect of the present disclosure.

With continued reference to FIG. 1, the batch feeder 160 can be configured to provide a metered amount of the vitrifiable feed material 110 to the feeder alcove 108. One example of the batch feeder 160 may include a rotating screw-type feeder that rotates within a feed tube 180 of a slightly larger diameter that is sealingly coupled to the cover 168 of the feeder alcove 108 (e.g., by way of a flexible sealing material) and provides the vitrifiable feed material 110 to the feeder alcove 108 through the batch inlet 176 at a controlled rate. Another example of the batch feeder 160 may include an extruder-type feeder that uses a piston, for example, to feed the vitrifiable feed material 110 through the batch inlet 176. The batch feeder 160 may be horizontally-oriented, as illustrated in FIG. 1, oriented at an angle from vertical (e.g., 5 degrees to 85 degrees, including all ranges, subranges, endpoints, and values in that range), as illustrated in FIG. 4, or vertically-oriented, as illustrated in FIG. 5. In some instances, the batch feeder 160 may include a cleaning device 161. In an example, the cleaning device 161 can include a chopper disposed on an end of the batch feeder 160 proximate the batch inlet 176. The chopper may include an inner tubular chopper configured to slide up and down and may include a chopping end configured to break or remove solidified glass from inner surfaces of the cleaning device 161. The cleaning device 161 can include at least one actuator (not shown) configured to move the chopper.

The storage device 162 can be operatively coupled to the batch feeder 160 and can provide the vitrifiable feed material 110 to the batch feeder 160. The storage device 162 may include a hopper, for example, which can contain and feed the vitrifiable feed material 110 to the batch feeder 160. The storage device 162 may also include other devices, for instance, a chute, silo, or other device(s), suitable for containing and feeding the vitrifiable feed material 110 to the batch feeder 160.

In some instances, at least one bubbler 182a,182b may be operatively coupled to the feeder alcove 108 and/or the melter 102. The at least one bubbler 182a, 182b may include a sacrificial component, for example, extending through a wall or floor of the feeder alcove 108 for introducing compressed or bubble gases into the glass melt 112 to assist in mixing the vitrifiable feed material 110 with the glass melt 112 around slow batch displacement zones. In FIG. 1, a first bubbler 182a is shown extending through a portion of the upstream wall 164 to provide compressed gas to the feeder alcove 108, and a second bubbler 182b is shown extending through the floor 126 of the melter 102 to provide compressed air into the melter 102. It will be appreciated that the at least one bubbler may be positioned in other suitable locations of the feeder alcove 108 and/or the melter 102. The at least one bubbler may be in communication with a compressed gas device 184 (FIG. 6), or any other device(s) suitable for providing gas for bubbling.

With reference to FIGS. 1 and 6, a heating device 186 may be disposed proximate to or as part of the feeder alcove 108 and may be inserted at a variety of positions and/or angles with respect to the feeder alcove 108. The heating device 186 can provide heat to the vitrifiable feed material 110 and/or the glass melt 112 and can function to ensure that the vitrifiable feed material 110 melts and/or flows from the feeder alcove 108 into the melter 102. In an example, the heating device 186 may include a low capacity burner coupled to the upstream wall 164 proximate to the batch inlet 176, where the heating device 186 can provide heat to the vitrifiable feed material 110 entering the feeder alcove 108.

FIG. 7 illustrates an example of a method 200 for providing vitrifiable feed material 110 to the melter 102. For purposes of illustration and clarity, method 200 will be described in the context of the melter 102 and feeder alcove 108 described above and generally illustrated in FIGS. 1 through 5. It will be appreciated, however, that the application of the present methodology is not meant to be limited solely to such an arrangement, but rather method 200 may find application with any number of arrangements.

Method 200 includes a step 202 of providing vitrifiable feed material 110 to the batch feeder 160. Providing the vitrifiable feed material 110 can include using a storage device 162, for example a hopper, to contain and feed the vitrifiable feed material 110. When the vitrifiable feed material 110 includes glass batch material, the glass batch material can include 100% raw material, 100% cullet, or a mixture of raw material and cullet (e.g., raw material to cullet ratio between 1:0 and 0:1). Providing the vitrifiable feed material 110 can also include using gravity and/or metering equipment (not shown) to feed the material 110 at a metered rate into the batch feeder 160.

Method 200 includes a step 204 of carrying the vitrifiable feed material 110 with the batch feeder 160 to the detachable feeder alcove 108. Carrying the vitrifiable feed material 110 can include using, for example, a screw conveyor or an extruder-type conveyor to carry the material 110, wherein the batch feeder 160 is sealingly coupled to the cover 168 to prevent and/or reduce fine particulates from escaping the batch feeder 160 and/or the feeder interior 170. During operation, the feeder alcove 108 can be completely or substantially occupied by vitrifiable feed material 110 that is fed by the batch feeder 160, which can serve as a protective barrier between the batch feeder 160 and the glass melt 112. Additionally, carrying the vitrifiable feed material 110 may include feeding the material 110 into the feeder alcove 108 having a reduced pressure, which further serves to prevent carryover and contain the fine particulates in the feeder interior 170.

Method 200 may include a step 206 of melting the vitrifiable feed material 110 in the melter 102. As the vitrifiable feed material 110 is fed into the feeder alcove 108 and the feeder interior 170, the material 110 can form a layer on the glass melt 112, where most of the feeder head space 172 is occupied by the material 110. This layer can be at least partially melted by the heat from the glass melt 112 and/or the heating device 186 and then flow into the melter interior 132 to be completely melted.

In some instances, method 200 may include a step 208 of providing compressed gas to the detachable feeder alcove 108 or the melter 102. The compressed gas can be provided, for example, from a compressed gas device 184 to the feeder alcove 108 and/or the melter 102 through the at least one bubbler 182a, 182b. The compressed air can provide physical motion to keep the vitrifiable feed material 110 moving in critical areas of the feeder alcove 108 and from forming frozen or built-up areas of material 110 or glass melt 112.

In some instances, method 200 may include a step 210 of moving or adjusting the extendable panel 174 carried by the melter 102 and/or the feeder alcove 108 based on a level of glass melt 112 in the melter 102. The extendable panel 174 can be adjusted to maintain contact with the glass melt 112 in the melter 102, to seal off the feeder interior 170 from the melter atmosphere (e.g., melter interior 132), and to restrict and reduce the amount of very fine batch material particles passing from the feeder alcove directly to the exhaust. In one example, adjusting the extendable panel 174 may include manually adjusting the extendable panel 174 to submerge the lower free end 178 under the glass melt 112. In another example, adjusting the extendable panel 174 may include using automated means (e.g., a controller, a servo motor, a hydraulic and/or pneumatic arm, and the like) to adjust the extendable panel 174. In some instances, a controller (connected to a wired or wireless network (the Internet of Things)) can be used to control the extendable panel 174 in response to change in level of glass melt 112.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The drawings are not necessarily shown to scale. The disclosure is intended to embrace all such modifications and variations as fall within the spirit and broad scope of the appended claims.

The invention claimed is:

1. A submerged combustion melter, comprising:
   a melting tank including:
   a floor configured to carry at least one submerged combustion burner,
   a roof,
   an inlet wall extending between the floor and the roof to at least partially establish a melting tank interior having a tank head space, and including at least one tank inlet; and
   a feeder alcove appended to the inlet wall of the melting tank to cover the at least one tank inlet, and including:
   at least one upstream wall, and
   a cover extending between the at least one upstream wall of the feeder alcove and the inlet wall of the melting tank to at least partially establish a feeder interior having a feeder head space shorter than the tank head space, and including at least one batch inlet in the cover configured to receive glass batch into the feeder interior.

2. The submerged combustion melter of claim 1, further comprising:
an extendable panel that extends downwardly below the at least one batch inlet of the feeder alcove to molten glass, and is configured to maintain contact with the molten glass to seal off a feeder alcove interior and to restrict and reduce batch material passing from the feeder alcove directly to an exhaust.

3. The submerged combustion melter of claim 1, wherein the feeder alcove is sealed from an outside atmosphere.

4. The submerged combustion melter of claim 3, wherein the feeder alcove is at a reduced pressure.

5. The submerged combustion melter of claim 1, further comprising:
a heating device configured to provide heat to the feeder alcove and including a burner coupled to the upstream wall of the feeder alcove.

6. The submerged combustion melter of claim 1, further comprising:
a cleaning device configured to clear the batch inlet of the feeder alcove.

7. The submerged combustion melter of claim 1, further comprising:
an extendable panel carried by at least one of the melting tank or the feeder alcove and disposed between a feeder interior of the feeder alcove and a tank interior of the melter.

8. The submerged combustion melter of claim 1, further comprising at least one bubbler carried by the feeder alcove to bubble gas into the feeder alcove upstream of the melting tank.

9. The submerged combustion melter of claim 1, wherein the at least one upstream wall extends upwardly and away from the inlet wall of the melting tank at an angle between 5 and 60 degrees from vertical.

10. The submerged combustion melter of claim 1, wherein the melting tank also includes at least one rear-end wall including a molten glass outlet, and a port in the roof at a location of the melting tank longitudinally opposite of the feeder alcove.

11. The submerged combustion melter of claim 1, wherein the feeder alcove further includes a bottom wall and a lower portion of the upstream wall extending upwardly from the bottom wall.

12. The submerged combustion melter in claim 1, further comprising:
a batch feeder coupled to the feeder alcove to feed batch material into the at least one batch inlet of the cover.

13. The submerged combustion melter of claim 12, wherein the batch feeder includes a feed tube vertically oriented with respect to the feeder alcove.

14. The submerged combustion melter of claim 12, wherein the batch feeder is oriented at an oblique angle to the feeder alcove.

15. The submerged combustion melter of claim 12, wherein the batch feeder includes at least one of a screw conveyor or an extruder.

16. The submerged combustion melter of claim 12, wherein the batch feeder includes a feed tube sealingly coupled to the cover of the feeder alcove.

17. The submerged combustion melter of claim 12, further comprising:
a storage device that provides batch material to the batch feeder.

18. The submerged combustion melter of claim 12, further comprising:
a cleaning device to clear the batch inlet of the feeder alcove and including a chopper disposed on an end of the batch feeder to break or remove solidified glass from inner surfaces of the cleaning device.

19. The submerged combustion melter in claim 1, wherein the at least one upstream wall includes a fluid-cooled panel.

* * * * *